Patented Oct. 29, 1946

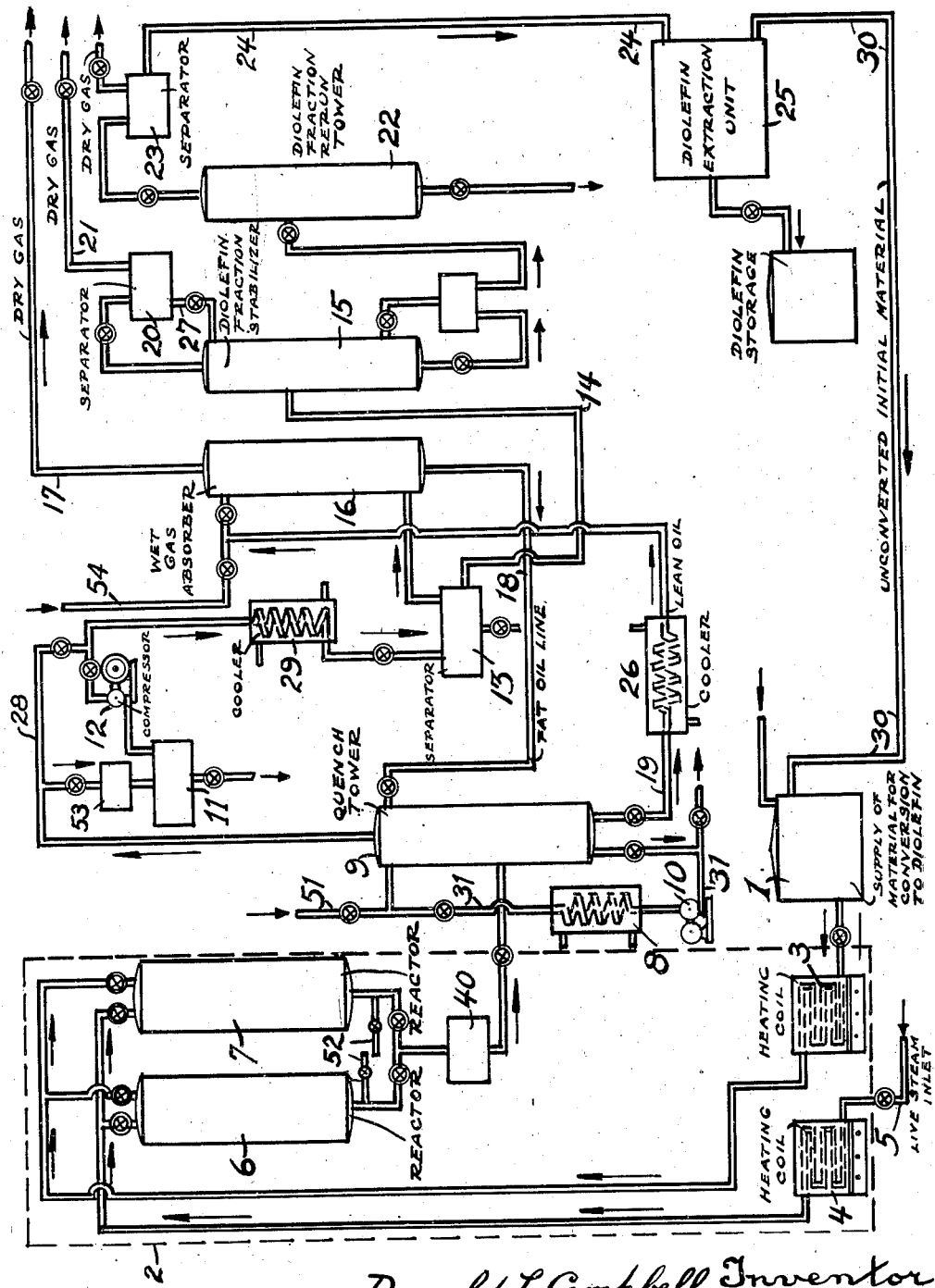

2,410,048

UNITED STATES PATENT OFFICE 2,410,048

CHEMICAL PROCESS

Donald L. Campbell, Short Hills, N. J., assignor to Standard Oil Development Company, a corporation of Delaware Application June 13, 1942, Serial No. 446,871

8 Claims. (Cl. 260—680)

This invention pertains to the production of olefins and diolefins.

Most processes for dehydrogenation, whether by thermal cracking, fixed bed catalytic cracking, or fluid catalyst cracking operate to discharge products from the reactor at a low total pressure, say from a pressure of 50 mm. absolute to a pressure of 10 lbs. gauge. Whether the feed stock is butane to be dehydrogenated to butene, butene to be dehydrogenated to butadiene, or butane to be dehydrogenated to butadiene, the products include a large amount of gases lower boiling than $C_4$. This means that it is impracticable to recover all the $C_4$, including the desired butene or butadiene product in the liquid state by simply cooling the products or by a simple combination of compression and cooling even with injection of liquid from the lower pressure condensing stages to the higher pressure condensing stages. Thus it is desirable to add an absorption system to compression in order to recover the full production of $C_4$ cut.

It is an object of the present invention to provide a novel method of quenching reaction gases formed in any high temperature dehydrogenation, dehydrohalogenation or thermal cracking process and recovering a maximum of olefins and diolefins therefrom by a combined compression and/or cooling and absorption system.

It is also an object of this invention to provide a novel method of stripping wet gas absorber oil in order that it may be reconditioned for use in the absorption system and any $C_4$ or $C_5$ compounds contained therein directly returned to the process.

It is a further object of this invention to provide the art with a novel process of dehydrogenating $C_4$ and $C_5$ compounds to olefins and diolefins and recycling unconverted compounds to the initial dehydrogenation step.

Other objects will appear from the detailed description and the claims which follow.

According to my invention, the hot reaction gases from a high temperature dehydrogenation or cracking process are quenched by direct contact with a fat oil whereupon the reaction gases are subjected to a compression and/or cooling treatment in order to condense as much of the heavier constituents as is possible. The uncondensed portion is then passed through an absorber wherein it is contacted with a suitable absorber oil which serves to withdraw the remainder of the desired $C_4$ and higher compounds.

The gas passing out of the top of the absorber is released to the burner line. The fat oil withdrawn from the bottom of the absorber is released to a point previous to the first stage of compression or cooling where it is contacted with the hot gaseous reaction products. This contacting at very low pressure and at as high an operating temperature as possible flashes the dissolved compounds from the fat oil and makes the resultant lean oil suitable for re-use in the absorber.

Heat for the stripping of the absorbed constituents from the fat oil is furnished by the sensible heat in the reaction products. A further benefit is obtained in that since it is necessary to quench the gaseous reaction products, contacting the hot gaseous reaction products with fat oil serves the dual purpose of quenching the reaction products and stripping the fat oil.

The vapors stripped from the fat oil recycle through the compressors to the final stage where, due to the fact that they are richer in higher boiling constituents than is the non-condensed gas ordinarily remaining after the last stage of compression and condensation, some of these recycled, absorbed, and stripped vapors condense. The undesired lower boiling constituents do not condense but go on to the absorber where they constitute a recycle gas and eventually they leave the top of the absorber with the dry gas. The increase in gas to be compressed and to be handled in the absorber is not substantial.

My process is intended primarily to be used in connection with the production of butadiene from fixed bed catalytic cracking of normal butenes. However, it could also be used in connection with fixed bed catalytic cracking of butane or a mixture of $C_4$ stocks to make butadiene or of butane to make butene, or of fluid catalyst cracking with any of the above processes, or with thermal cracking with any of the above processes, or of thermal cracking with steam with any of the above processes, or with high-temperature, low-pressure thermal cracking with or without steam, or of heavy naphtha or gas oil to make butene, butadiene, or both.

The figure of the accompanying drawing illustrates diagrammatically a flow plan of my process as applied to the production of butadiene by the dehydrogenation of butene.

As shown in the drawing, I represents a source of supply of materials suitable for conversion to diolefins, while 2 represents any suitable means for forming diolefins at high temperatures, as by catalytic dehydrogenation, thermal cracking, dehydrohalogenation and the like. Each of these processes is characterized by the formation of diolefins at such high temperatures that the diolefin is thermally unstable. These processes are well known to the art and need not be described here in detail. Suffice to say, butadiene may be produced by dehydrogenation of n-butane or the n-butenes with or without a catalyst, or by dehydrochlorination of n-butene dichloride. Isoprene and other $C_5$ diolefines may similarly be prepared from pentane and the pentenes or from the pentene dichlorides.

For illustrative purposes, the drawing shows an effective arrangement for catalytically dehydrogenating butene to butadiene. In this arrangement 3 represents a heater for preheating the butene to about 1200° F. or just below reaction temperature. 4 is a heater which serves to superheat the steam obtained from the live steam supply line 5 to a temperature sufficient, upon admixing of the steam with the butene in suitable proportions, to raise the temperature thereof to reaction temperature. The steam may, for example, be under a pressure of 40 lbs./sq. in., at a temperature of 1400° F. and admixed with butene in the ratio of 7 volumes per volume of butene.

Reactors 6 and 7 are provided, which contain a suitable catalyst. It is preferred that the catalyst by one having both dehydrogenation and water gas activity. A suitable catalyst of this type is one containing magnesium, iron, potassium and copper oxides. Since a small amount of side reaction occurs unavoidably, there is some coke formation in the reactors. While most of the coke formed is converted almost immediately during the run of the reactor, due to the water gas activity of the catalyst, it is preferable to shut off the supply of butene to the reactor periodically while continuing the supply of steam, whereby any residue of coke in the reactor is converted to $CO_2$ and $H_2$. Accordingly, the reactors are generally arranged in pairs, so that one can function to dehydrogenate butene while the other is subjected to a steaming operation to convert any coke present therein and revivify the catalyst. While the on-stream and steaming periods may be varied somewhat, it has been found convenient when the reactors are arranged in pairs, to have the cycle consist of 1-hour dehydrogenation time followed by 1-hour steaming.

The butene-steam mixture is passed through the catalyst space at the rate of 500 volumes of butene (measured at standard conditions) per volume of catalyst per hour. The temperature at the inlet to the catalyst zone is approximately 1300° F. and the reaction mixture is discharged from the reactor at about 1175° F. The butadiene is quite unstable at this temperature and, to prevent or minimize degradation thereof as by polymerization, it is essential to cool or quench the reaction mixture as rapidly as possible. Accordingly, the products leaving the dehydrogenation zone are quenched with a suitable cooling fluid supplied through line 52 which fluid may be water or fat oil hereinafter mentioned from absorber 16, and then passed through waste heat boiler 40 to the quench tower 9 wherein the reaction gases are cooled to from about 550° F to about 300° F. i. e., a temperature sufficiently low that the diolefin is thermally stable but not low enough to condense the steam. A pump 10 is provided in line 31 for recirculating the quenching fluid through the tower 9. A cooling coil or other heat removal facilities 8 may be provided in the line 31 to give the necessary temperature control in the quenching operation. The quenched gaseous reaction products are then passed through a cooler and condenser 53 to a separator 11 wherein some of the water present is removed. The gases are then passed to compressors 12 wherein they are compressed to from about ½ to about 370 pounds per square inch gage. The compressed reaction products are then passed through cooler and condenser 29 wherein they are cooled to about 65° F. to liquefy the $C_4$ hydrocarbons and then passed to a separator 13 wherein most of the remaining water is removed as the bottoms and the liquefied $C_4$ fraction is removed through line 14 and passed to the stabilizer 15. The overhead from separator 13 is passed to the wet gas absorber 16 wherein it is brought into contact with a suitable absorber oil such as light gas oil in order to recover essentially all of the uncondensed $C_4$ hydrocarbons, particularly butadiene. Hydrogen, carbon dioxide, propanes and lighter hydrocarbon gases in dry form are discharged through outlet 17.

The absorber oil used in absorber 16 becomes more or less saturated with the $C_3$ and higher hydrocarbons contained in the gases passed therethrough and it becomes necessary periodically to subject the saturated or fat oil to a stripping operation. Instead of providing a separate stripper therefor, the fat oil may be stripped in an advantageous manner by passing it through line 18 to quench tower 9 where it serves as the quenching fluid. The fat oil may be supplied to the quench tower at about 85° F., the temperature at which it is discharged from the absorber, or if desired it may be subjected to suitable heat control before injection to assure proper quenching in tower 9. If the temperature of the fat oil is such that the quench tower 9 cannot take the full cooling effect of the fat oil, it may be passed in heat exchange relation with the lean oil to effect temperature adjustment. The hot reaction gases strip the fat oil, thereby directly returning the absorbed $C_4$ hydrocarbons to the reaction products discharged from the tower 9. The stripped or lean oil may be removed from the tower 9 and returned through line 19 to the wet gas absorber 16 preferably after passing through cooler 26 wherein the lean oil is cooled to about 60° F. or sufficiently low to assure efficient absorption of the $C_4$ fraction in the absorber 16. Auxiliary stripping means, not shown, may also be used.

The bulk of the oil in quench tower 9 is continuously recirculated by means of a pump 10. Due to a gradual accumulation of polymers in the recirculated oil, it is necessary to bleed off some of this oil to effect a separation of these polymers. Fresh make-up oil or the oil after the polymer separation is supplied to the system either through connection 51 at the quenching tower or through connection 54 at the wet gas absorber 16.

The $C_4$ fraction removed from separator 13 passes to the stabilizer 15 wherein it is subjected to a fractional distillation to remove any gaseous impurities contained therein which pass as overhead to separator 20 and are discharged at 21. A liquid reflux may be returned from separator 20 to the still 15 through line 27. The bottoms from still 15 are passed to a rerun tower 22 wherein they are again subjected to fractional distillation. The $C_4$ cut passes as overhead to separator 23, wherefrom a negligible amount of gases are removed as overhead and the $C_4$ fraction, containing essentially butadiene, unconverted butene and some butane, is removed at 24 and passed to a suitable extraction means 25 wherein butadiene is separated from the butene and butane. The butene and butane separated in extractor 25 may be returned through line 30 to supply 1 for recirculation in the process.

In certain process of preparing diolefins, as in using dehydrogenation catalysts which are harmed by steam and require its exclusion from the feed, the reaction product may not contain any water, in which event water separation in 11 and 13 would not be necessary unless, of course, water is used in the initial quench. When the reaction product is free from water, it may, if desired, be cooled sufficiently to liquefy the $C_4$ and higher hydrocarbons without any danger of ice formation thereby obviating the necessity of compressing the reaction gases. In this case, the reaction gases would be by-passed around the separator 11 and compressor 12 and would go directly from the quench tower 9 through line 28 to the cooler or condenser 29 and thence to a separator 13 wherein the liquefied product would be separated from the wet gases and passed to the stabilizer 15 while the wet gases are passed to the absorber 16.

While the above description is for the most part directed to the production of butadiene, it is to be understood that my invention is not limited thereto but is applicable to the production of olefins and diolefins in general since, at most, only minor alterations in temperatures, pressure, and the like, from those disclosed above would be made when applying my process to the production of other compounds.

What I claim and desire to secure by Letters Patent is:

1. In the process of producing butadiene and homologues thereof wherein the diolefin is formed at relatively high temperatures, the improvement which comprises rapidly quenching the reaction products from the high temperature diolefin formation step by contacting the hot reaction products first with water and then with a relatively cool liquid comprising a fat oil, separating cooled product gas from the quenching liquid, liquefying a diolefin-containing fraction in the cooled product gas, separating uncondensed gases from this fraction, washing said uncondensed gases with an absorber oil to recover diolefins therefrom and utilizing the fat oil formed in this washing step in the aforesaid quenching step.

2. In the process of producing butadiene and homologues thereof wherein the diolefin is formed at relatively high temperatures, the improvement which comprises rapidly quenching the reaction products from the high temperature diolefin formation step to a temperature sufficiently low to inhibit degradation of the diolefins present by contacting the hot reaction products first with water and then with a relatively cool liquid comprising a fat oil, separating cooled product gas from the quenching liquid, liquefying a diolefin-containing fraction in the cooled product gas, separating uncondensed gases from this fraction, washing said uncondensed gases with an absorber oil to receover diolefins therefrom, utilizing the fat oil formed in this washing step in the aforesaid quenching step thereby stripping said fat oil of absorbed diolefins and returning the stripped oil to said washing step.

3. The process of producing butadiene which comprises dehydrogenating butene to butadiene at elevated temperatures, rapidly quenching the reaction product from said dehydrogenating step to a temperature sufficiently low to inhibit degradation of the diolefins present by contacting the hot reaction products from said dehydrogenation step first with water and then with a relatively cool liquid comprising a fat oil, separating cooled product gas from the quenching liquid, liquefying a $C_4$ fraction in said cooled product gas, separating uncondensed gases from said liquefied $C_4$ fraction, washing said uncondensed gases with an absorber oil to recover diolefins therefrom, utilizing the fat oil formed in this washing step in the aforesaid quenching step thereby stripping said fat oil of absorbed butadiene and butene, cooling the stripped oil and returning it to said washing step.

4. The process of producing butadiene which comprises dehydrogenating butene to butadiene at elevated temperatures, rapidly quenching the reaction product from said dehydrogenating step to a temperature sufficiently low to inhibit degradation of the diolefins present by contacting the hot reaction products from said dehydrogenation step first with water and then with a relatively cool liquid comprising a fat oil, separating cooled product gas from the quenching liquid, liquefying a $C_4$ fraction in said cooled product gas, separating uncondensed gases from said liquefied $C_4$ fraction, subjecting the liquefied $C_4$ fraction to fractional distillation to separate gaseous impurities as well as $C_5$ and higher molecular compounds from a fraction consisting essentially of butene and butadiene, washing said uncondensed gases with an absorber oil to recover diolefins therefrom, utilizing the fat oil formed in this washing step in the aforesaid quenching step thereby stripping said fat oil of absorbed butadiene and butene, cooling the stripped oil and returning it to said washing step.

5. The process of producing butadiene which comprises dehydrogenating butene to butadiene at elevated temperatures, rapidly quenching the reaction product from said dehydrogenating step to a temperature sufficiently low to inhibit degradation of the diolefins present by contacting the hot reaction products from said dehydrogenation step first with water and then with a relatively cool liquid comprising a fat oil, separating cooled product gas from the quenching liquid, liquefying a $C_4$ fraction in said cooled product gas, separating uncondensed gases from said liquefied $C_4$ fraction, subjecting the liquefied $C_4$ fraction to fractional distillation to separate gaseous impurities as well as $C_5$ and higher molecular compounds from a fraction consisting essentially of butene and butadiene, separating the butadiene from the butene in said product, recycling the butene to the dehydrogenation step, washing said uncondensed gases with an absorber oil to recover diolefins therefrom, utilizing the fat oil formed in this washing step in the aforesaid quenching step thereby stripping said fat oil of absorbed butadiene and butene, cooling the stripped oil and returning it to said washing step.

6. The process of producing butadiene which comprises dehydrogenating butene to butadiene at elevated temperatures, rapidly quenching the reaction product from said dehydrogenating step to a temperature sufficiently low to inhibit degradation of the diolefins present by contacting the hot reaction products from said dehydrogenation step first with water and then with a relatively cool liquid comprising a fat oil, separating cooled product gas from the quenching liquid, liquefying a $C_4$ fraction in said cooled product gas, separating uncondensed gases from said liquefied C₄ fraction, washing said uncondensed gases with an absorber oil to recover diolefins therefrom, utilizing the fat oil formed in this washing step in the aforesaid quenching step thereby stripping said fat oil of absorbed butadiene and butene, cooling the stripped oil, returning it to said washing step, withdrawing a part of the absorber oil from the system, separating the polymers contained therein and returning the purified absorber oil to the system.

7. The process of producing butadiene which comprises dehydrogenating butene to butadiene at elevated temperatures, partially quenching the reaction products from the dehydrogenation step by contacting the same with water, contacting the partially quenched reaction products with relatively cool fat oil thereby stripping the fat oil and cooling the product gases, separating cooled product gases from the stripped oil, liquefying a C₄ fraction in said cooled product gases, separating uncondensed gases from said liquefied C₄ fraction, washing said uncondensed gases with an absorber oil to recover butadiene and butene therefrom, using the fat oil obtained in this washing step as the fat oil for contact with said partially quenched product gases thereby stripping said fat oil of absorbed butene and butadiene, cooling the stripped absorber oil and returning it to said washing step.

8. In the process for the production of diolefinic hydrocarbons by a high temperature reaction, the improvement which comprises contacting the hot gaseous reaction products first with water and then with a relatively cool liquid comprising a fat oil, separating the cooled gaseous reaction products from said oil, liquefying a fraction containing the bulk of the diolefinic compounds in said reaction products, separating uncondensed gases from said liquefied fraction, washing the uncondensed gases with an absorber oil to recover diolefinic compounds therefrom, using the fat oil obtained in the washing step as the fat oil for contacting said hot gaseous reaction products, thereby stripping said fat oil of absorbed diolefinic compounds and returning the stripped oil to the washing step.

DONALD L. CAMPBELL.